United States Patent [19]

Piloni et al.

[11] 4,308,789
[45] Jan. 5, 1982

[54] AUTOMATIC COFFEE MACHINES

[76] Inventors: Taddeo Piloni; Paolo Valente, both of via Noccoli 30, Cremeno, Como, Italy

[21] Appl. No.: 134,521

[22] Filed: Mar. 27, 1980

[30] Foreign Application Priority Data

Apr. 4, 1979 [ES] Spain .................................... 479.290

[51] Int. Cl.³ ............................................ A47J 31/34
[52] U.S. Cl. ................................................. 99/289 R
[58] Field of Search ............. 99/289 R, 289 D, 289 P, 99/295, 287, 302 R

[56] References Cited

U.S. PATENT DOCUMENTS

| | | | |
|---|---|---|---|
| 3,349,690 | 10/1967 | Heier | 99/289 R |
| 3,369,478 | 2/1968 | Black | 99/289 R |
| 3,660,117 | 5/1972 | Neely | 99/289 R |
| 4,188,863 | 2/1980 | Grossi | 99/289 R |

Primary Examiner—Robert W. Jenkins
Attorney, Agent, or Firm—Lerner, David, Littenberg & Samuel

[57] ABSTRACT

An automatic coffee machine comprising a stationary cylinder wherein the coffee infusion is made; a lower piston vertically reciprocable within said cylinder between a coffee making lower position and an exhausted coffee dreg discharging upper position in line with the upper edge of said cylinder; an upper piston vertically reciprocable between a coffee making lower position within said cylinder and an upper position outside said cylinder, said upper piston being shiftable, in its upper position, from its alignment with said cylinder, in order to leave a coffee powder dose feeding funnel to be aligned with said cylinder; hot water feeding means into said cylinder between said pistons when in their coffee making positions; means for collecting the coffee infusion as obtained by passage of said hot water through said powdered coffee dose; and means for mechanically and sequentially controlling said piston motions and hot water feeding means. For controlling the motions of upper piston and funnel, a double lever system effects a lifting of said upper piston and then an oscillation thereof, together with the funnel around a horizontal axis in order to alternately axially align said upper piston and said funnel with the cylinder.

7 Claims, 4 Drawing Figures

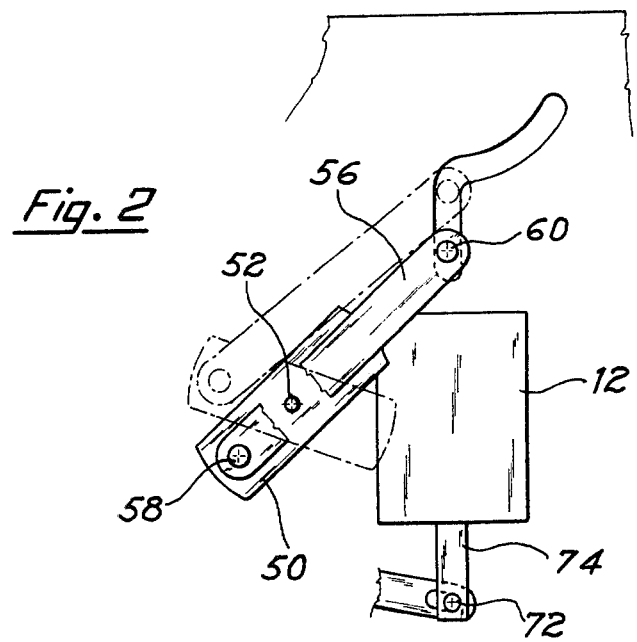
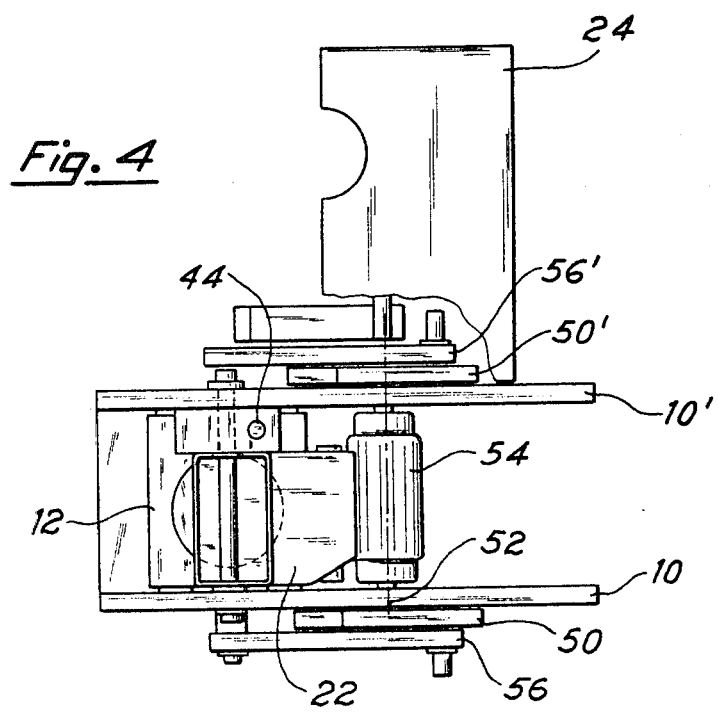

AUTOMATIC COFFEE MACHINES

BACKGROUND OF THE INVENTION

1. Field of the Invention

This invention relates to improvements in and to automatic coffee machines, of the type comprising: a stationary cylinder wherein the coffee infusion is made; a lower piston vertically reciprocable within said cylinder between a coffee making lower position and an exhaused coffee dreg discharging upper position in line with the upper edge of said cylinder; an upper piston vertically reciprocable between a coffee making lower position within said cylinder and an upper position outside said cylinder, said upper piston being shiftable, in its upper position, from its alignment with said cylinder, in order to leave a coffee powder dose feeding funnel to be aligned with said cylinder; hot water feeding means into said cylinder between said pistons when in their coffee making positions; means for collecting the coffee infusion as obtained by passage of said hot water through said powdered coffee dose; and means for mechanically and sequentially controlling said piston motions and hot water feeding means.

2. Description of the Prior Art

An automatic coffee machine is disclosed in the U.S. patent application Ser. No. 28,090 filed on Apr. 9, 1979 and now U.S. Pat. No. 4,271,752, issued June 9, 1981, in the name of the same Applicants.

This known machine comprises side frame walls to which all operative components are fastenend or sustained. In particular the movements of upper and lower piston are herein mechanically controlled by a single motor operating on lever and cam systems. The lower piston is reciprocated by a two-lever system acted upon by two cams directly or indirectly controlled by said motor. The upper piston is slidably mounted on a vertical guide which in turn is fastened to an horizontally slidable block carrying said funnel. A L-shaped groove in said side walls has an horizontal length to guide the upper piston and funnel respectively into alignment with said cylinder, and a vertical length to guide the upper piston in its vertical reciprocating motion when in alignment with the cylinder.

A three lever systems controls the upper piston movements. The mechanical control of said operative components according to this known apparatus allows to avoid the costs of providing numerous microswitches, relays and consent means which impair the reliability of the apparatus. However, this mechanical control presents some difficulties in exactly phase controlling the movements of two pistons and funnel and particularly in exactly guiding the upper piston in its vertical motion so that it always maintains its axial alignment with cylinder in order to ensure a complete seal thereof also after numerous operating cycles.

SUMMARY OF THE INVENTION

An object of this invention is to improve the above stated known apparatus in order to render more reliable and simple the mechanical control of the piston motions, in particular the upper piston and funnel motion.

In order to achieve the above and further objects, this invention concerns an automatic coffee machine of the above stated type, and wherein said upper piston is guided by a lever system along a path comprising a first vertical portion axially aligned with the cylinder and a second arc-chaped portion, said second path portion being carried-out around a fixed horizontal axis and with simultaneous controlled rotation of said funnel between an operative position in alignment with the cylinder and a rest position shifted from said cylinder.

BRIEF DESCRIPTION OF THE DRAWINGS

FIG. 2 is a diagrammatic side view showing the lever system for controlling the upper piston and funnel motions in the machine of FIG. 1.

FIG. 4 is a plant view of the machine.

DESCRIPTION OF THE PREFERRED EMBODIMENT

Figure 1:
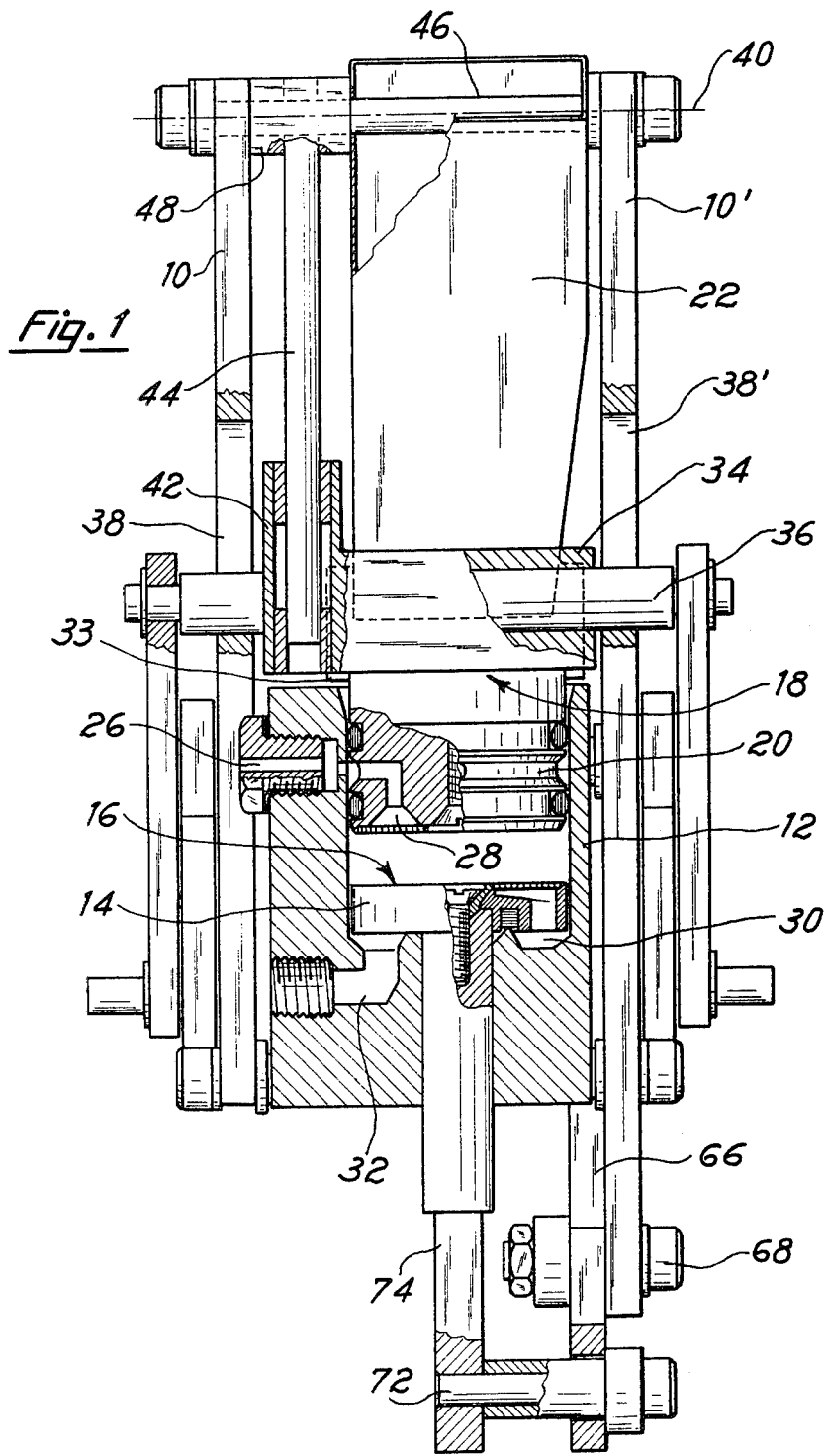
FIG. 1 is a front view with parts in section of an automatic coffee machine according to this invention.
Figure 3:
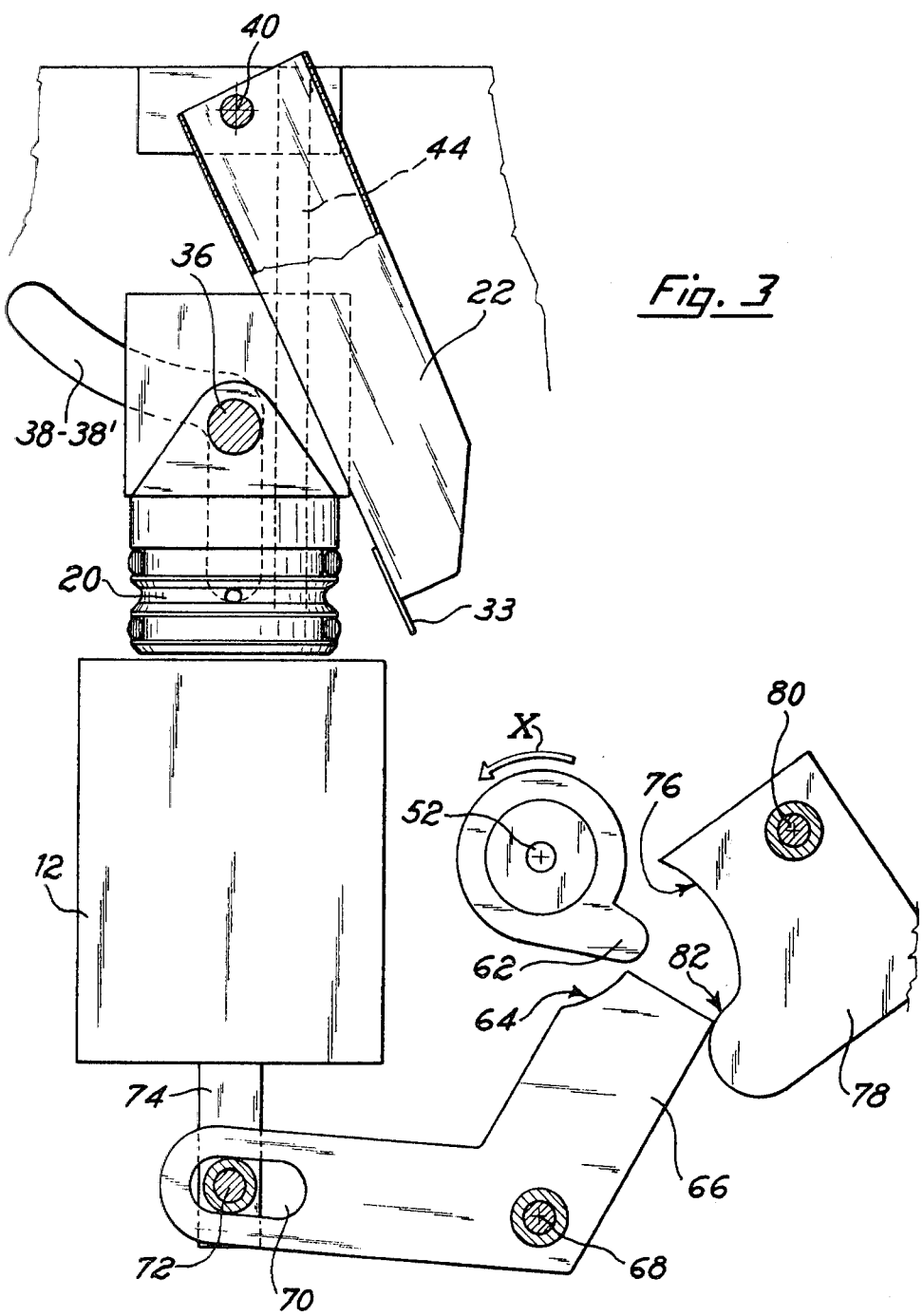
FIG. 3 is a diagrammatic side view showing both the lever-cam system which controls the lower piston motions and the upper piston and funnel oscillating motions.

The shown automatic coffee machine comprises in a known manner two frame side walls 10,10' wherein a cylinder 12 is rigidly housed. Within said cylinder 12 a first lower piston 14 reciprocates between a first coffee making lower position, as shown in FIG. 1, and a second upper position wherein the upper surface 16 of piston 14 is in alignment with the upper edge 18 of cylinder 12 in order to eject a spent coffee dreg. A second upper piston 20 is axially movable between a first coffee making lower position, as shown in FIG. 1, and a second position outside the cylinder 12, as diagrammatically shown in FIG. 3. When in said second position, the upper piston 20 has to be shifted in a third position wherein it is no more axially aligned with said cylinder in order to allow a funnel 22 to be positioned in such a manner that its open discharging end be above said cylinder in order to feed therein a pre-set powdered coffee dose.

As said in the abovestated prior patent application, said powdered coffee dose is poured within said cylinder 12 when the lower piston 14 has reached or is near to its lower position. Thereafter the upper piston 20 is moved in its first lower position in order to suitably press the powdered coffee. A hot water pre-set dose is then delivered from a boiler 24 through a duct 26 into a chamber 28 provided for in the upper piston 20, and from this chamber through the powdered coffee dose between said pistons 14 and 20 in order to form the required infusion. This infusion passes through the lower piston 14, is collected in a chamber 30 and then delivered through a duct 32. At the end, both pistons 14 and 20 are lifted so to bring the spent coffee dreg outside the cylinder and the upper piston 20 is shifted to its third position with simultaneous motion of funnel 22, which carries a scraper 33 to eject said dreg. The lower piston 14 reaches its lower position and the apparatus is ready for a further operation. As shown in the drawings, the upper piston 20 is fastened to a supporting block 34, which in turn carries a pin or axle 36 having free ends protruding outside shaped grooves 38,38' as foreseen in said frame walls 10,10', the shape of said grooves 38,38' corresponding to the path of said piston from its first to its third position and comprising a first length parallel to the cylinder axis and a second length in the form of an arc with center on an horizontal axis 40 in an upper position and in the same vertical plane containing the axis of cylinder 12. Said block 34 carries a bushing 42 parallel to the axis of piston 20 and wherein a rod 44 may freely slide. Said rod 44 is turn fixed to an axle 46 rotatably mounted in said walls 10, 10' for free rotations about the abovestated axis 40, and is fixed by means of a plate 48 to said funnel 22 in such a manner that this latter can oscillate with the upper piston 20 without following the vertical motions thereof.

The motions of block 34, and accordingly of piston 20 and funnel 22, are controlled by a double-lever system housed sidewardly to each wall 10,10' and comprising a first lever 50,50' which rotates about an axis 52 housed in said walls 10,10' under the control of motor means 54, and a second lever 56,56' which is pivotally connected both at 58, 58' to the first lever 50,50' and at 60,60' to the protrusions of axle 36. Accordingly, when the motor rotates said system controls the motions of block 34 along a path as defined by grooves 38,38'.

The motions of lower piston 14 are carried-out in phase with those of upper piston 20 under the control of the same motor means 54. As particularly shown in FIG. 3, the axis 52 rotates a first cam 62 in the direction of arrow X, to operate a cam profile 64 of a two arm lever 66 pivotally connected at 68 to least one of walls 10, 10'. On its opposite side, the lever 66 carries an elongated opening 70 to house a pin 72 in turn fastened to the lower end of a rod 74 carried by piston 14 and sealingly reciprocable through the bottom of cylinder 12. When cam 62 urges said cam profile 64, the lever 66 is rotated in a clockwise direction and lifts rod 74 and piston 14. After a further given rotation of cam 62, it operates on a cam profile 76 of a further cam 78 which is pivotally fastened at 80 to said one of walls 10, 10'. A further cam profile 82 of cam 78 operates the lever 66 to lower rod 74 and piston 14. The shown cam-lever system operates the lower piston 14 in synchronism with the double-lever system 50,50', 56,56' acting on upper piston 20 so that, starting from a rest position in which funnel 22 is aligned with the cylinder 12 and lower piston 14 is in its lowermost position, the motor 54 firstly operates on block 34 to oscillate funnel 22 and upper piston 20 and lower this piston 20 into the cylinder. After a timed motor stop for making the coffee infusion, said motor 54 simultaneously operates said levers 50, 50', 56, 56' to lift upper piston 20 and said cam profile 64 to lift lower piston 14. At the end of piston lifting stroke, said upper piston and funnel are oscillated, while the cam 62 accomplishes a not-operating arc in order to keep the lower piston in its upper position and allow the scraper 33 to discharge the spent coffee dreg. Finally, the cam 62 operates cam 78 and lever 66 to lower piston 14 before stopping the apparatus ready for a new cycle.

It is to be understood that many changes and modifications can be made to the shown embodiment without departing from the spirit and scope of this invention.

We claim:

1. Apparatus for preparing and delivering a coffee infusion comprising a fixed cylinder including a first end and a second end, said fixed cylinder including an upper rim located at said first end thereof, a first piston mounted for reciprocation within said fixed cylinder between a first position within said cylinder and displaced from said upper rim and a second position in alignment with said upper rim, a second piston mounted for movement along a path comprising first and second path portions, said first path portion being located in the plane of said fixed cylinder and including a first end and a second end, said first end of said first path portion being located within said fixed cylinder and said second end of said first path portion being located outside of said fixed cylinder, said second path portion comprising an arcuate path having a center defined by a horizontal axis and being located in the plane of said fixed cylinder, said second path portion comprising a first end and a second end, said first end of said second path portion coinciding with said second end of said first path portion, and said second end of said second path portion being displaced outside of the plane of said fixed cylinder, means for supplying hot water to said fixed cylinder when said first piston is in said first position and said second piston is located at said first end of said first path portion, collecting means for collecting coffee produced in said fixed cylinder by the passage of said hot water therethrough, control means for controlling the movement of said second piston along said path, funnel means for delivering a predetermined amount of coffee powder to said fixed cylinder, said funnel means having a first end and a second end, and being pivotable between a first position wherein said second end of said funnel means is in alignment with said fixed cylinder whereby said coffee powder may be fed thereinto, and a second position wherein said second end of said funnel means is pivoted out of the plane of said fixed cylinder, said funnel means being pivotable about a point corresponding to said center of said arcuate path at said first end of said funnel means.

2. The apparatus of claim 1 wherein said second piston is mounted on a supporting block member, and wherein said control means for said second piston includes a pin member connected to said supporting block member, said apparatus including at least one support wall mounted adjacent to the plane of said fixed cylinder, said support wall including groove means corresponding to said path for said second piston, whereby said pin member protrudes through said groove means of said support wall so that the movement of said second piston along said path may be controlled through the motion of said pin member.

3. The apparatus of claim 2 wherein said control means includes motor means, including a motor shaft, and lever means for interconnecting said shaft of said motor means with said pin member protruding through said groove means of said support wall, whereby upon rotation of said motor shaft said pin member is caused to move along said path so as to guide the motion of said second piston therealong.

4. The apparatus of claim 3 wherein said lever means comprises a first lever and a second lever, said first lever including a first end and a second end, said first end of said first lever being connected to said motor shaft for rotation therewith, and said second lever including a first end and a second end, said first end of said second lever being pivotally connected to said second end of said first lever, and said second end of said second lever being pivotally connected to said pin member.

5. The apparatus of claim 3 including first piston control means for controlling the reciprocating motion of said first piston, said first piston control means including a first pivotable lever arm having a first end and a second end, said first end of said first lever arm being connected to said first piston, cam means attached to said motor shaft of said control means for said second piston for rotation therewith, said rotation of said cam means causing intermittent contact of said cam means with said second end of said first lever means to effect the pivoting thereof so as to cause the reciprocating motion of said first piston.

6. The apparatus of claim 5 including a second pivotable lever arm including first and second camming surfaces, said first camming surface being located adjacent to said cam means and said second camming surface being located adjacent to said second end of said first pivotable lever arm, whereby when said cam means contacts said first camming surface said second pivotable lever arm is caused to pivot, thereby causing said second camming surface thereof to contact said second end of said first pivotable level arm, thus causing said first pivotable lever arm to pivot, thereby effecting the reciprocating motion of said first piston.

7. The apparatus of claim 1 including rotatable axle means located at said horizontal axis defining said center of said second path portion, said first end of said funnel means being affixed to said rotatable axle means for rotation therewith, and wherein said control means for said second piston includes interconnection means having a first end and a second end, said first end of said interconnection means being affixed to said rotatable axle means for rotation therewith, and said second end of said interconnection means being connected to said second piston whereby when said second piston moves along said second path portion said second end of said interconnection means follows such arcuate movement, thereby causing said first end of said interconnection means to rotate, thereby causing corresponding rotation of said funnel means between said first and second positions thereof.

* * * * *